No. 786,278. PATENTED APR. 4, 1905.
C. C. FARMER & J. J. STUCKEY.
APPARATUS FOR CONVEYING MAIL.
APPLICATION FILED AUG. 1, 1904.

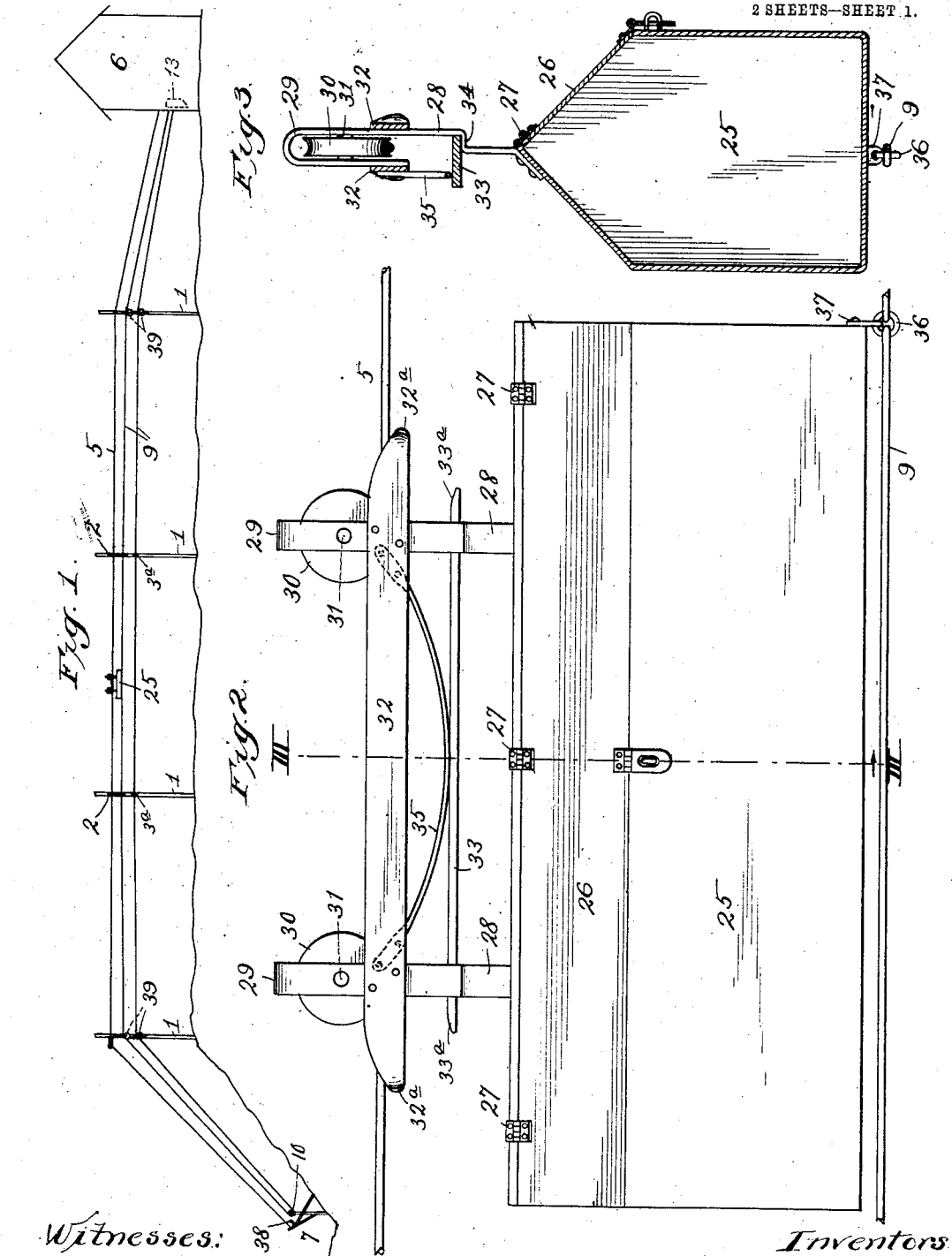

2 SHEETS—SHEET 2.

Witnesses:
A. McArthur
J. Moore

Inventors:
Charles C. Farmer
and John J. Stuckey
by F. G. Fischer Atty.

No. 786,278. Patented April 4, 1905.

UNITED STATES PATENT OFFICE.

CHARLES C. FARMER AND JOHN J. STUCKEY, OF LEAVENWORTH, KANSAS.

APPARATUS FOR CONVEYING MAIL.

SPECIFICATION forming part of Letters Patent No. 786,278, dated April 4, 1905.

Application filed August 1, 1904. Serial No. 219,129.

*To all whom it may concern:*

Be it known that we, CHARLES C. FARMER and JOHN J. STUCKEY, citizens of the United States, residing at Leavenworth, in the county of Leavenworth and State of Kansas, have invented certain new and useful Improvements in Apparatus for Conveying Mail, of which the following is a specification.

Our invention relates to an apparatus for conveying mail; and our object is to produce a reliable and convenient means for transmitting mail to and from farm-houses located some distance from the roads traveled by carriers employed in the rural-route service.

The principal features of the invention reside in an elevated track, a mail-box arranged to travel thereon, an endless cable for operating the mail-box, and a motor for propelling the cable.

In order that the invention may be readily understood, reference will now be made to the accompanying drawings, in which—

Figure 4:
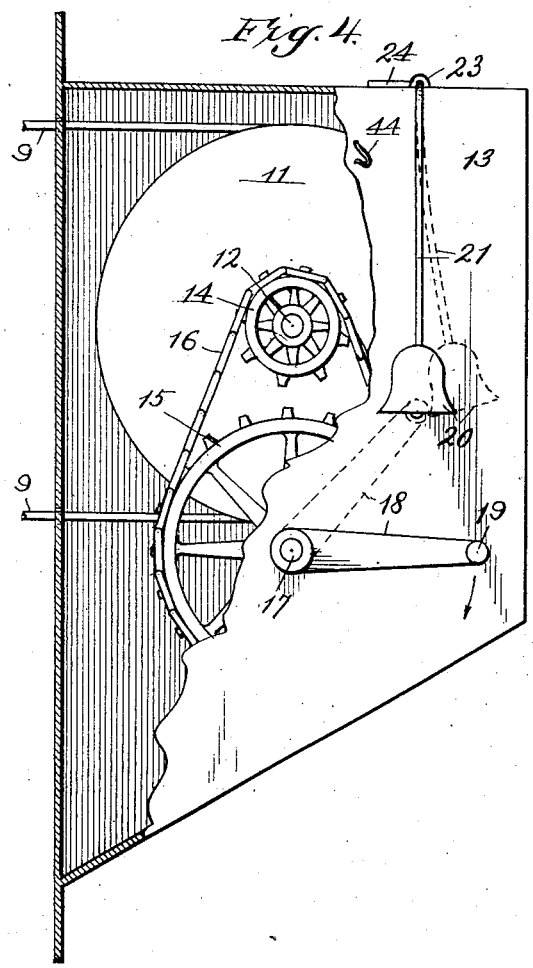
Figure 6:
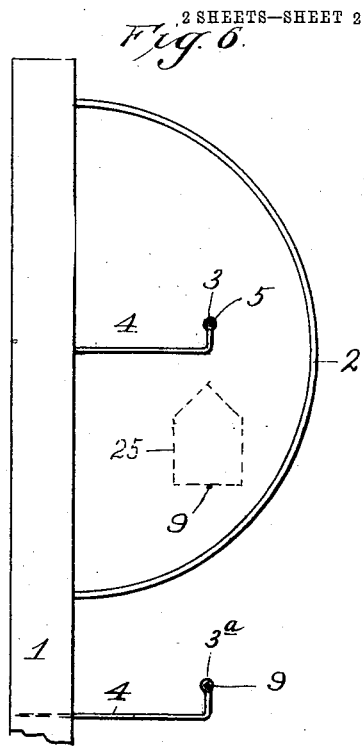
Figure 5:
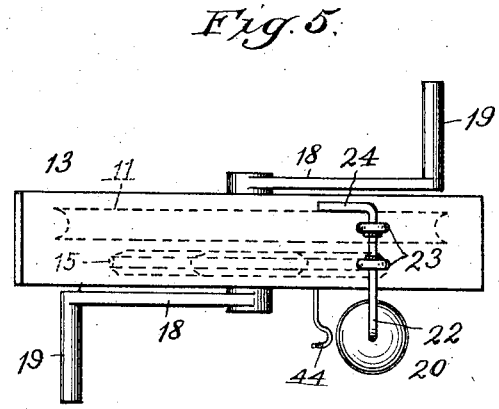
Figure 7:
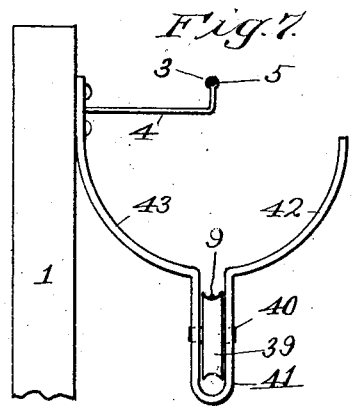

Figure 1 represents a side elevation of the apparatus in position for operation. Fig. 2 is an enlarged side elevation of the mail-box forming part of the invention. Fig. 3 is a transverse section of the same, taken on line III III of Fig. 2. Fig. 4 is an enlarged side elevation, partly in section, of the motor for propelling the endless cable. Fig. 5 is a plan view of the same. Fig. 6 is an enlarged broken elevation of one of the supporting-posts, eyelets for carrying the track and the cable, and a bow for limiting the swaying movement of the cable. Fig. 7 is an enlarged broken elevation of one of the supporting-posts and attachments forming part of the invention.

In carrying out the invention we employ a suitable number of supporting-posts 1, each of which is provided with a bow 2, constructed, preferably, of wire, and a pair of eyelets 3 $3^a$, the former of which is located within bow 2 vertically above the eyelet $3^a$. Said eyelets have right-angular arms 4, pointed at their inner terminals, so they may be driven into the post.

5 designates a track, consisting of a single wire extending through eyelets 3 and attached at its opposite ends to a portion of the farm-house 6 and a support 7, located at one side of road 8.

9 designates an endless cable, the upper strand of which extends through bows 2, while the lower strand extends through eyelets $3^a$. Said cable operates around a sheave-wheel 10 on support 7 and a sheave-wheel 11, forming part of the motor, which latter may be secured to any portion of the exterior or interior of the house. Sheave-wheel 11 is rigidly mounted upon a transverse shaft 12, journaled in the opposite sides of a casing 13 and provided with a small rigidly-mounted sprocket-wheel 14, arranged beside the sheave-wheel. Said sprocket-wheel is connected to a large sprocket-wheel 15 through the instrumentality of an endless sprocket-chain 16. Sprocket-wheel 15 is rigidly mounted upon a transverse shaft 17, journaled in the opposite sides of casing 13 and provided at its opposite ends with rigidly-mounted cranks 18, extending in opposite directions and provided at their outer ends with handles 19.

20 designates a bell suspended in the path of one of the cranks at the lower terminal of a spring-wire 21, having a right-angular upper portion 22, pivotally secured in staples 23 on top of the casing and terminating in a crank-arm 24, which rests upon the top of the casing when wire 21 is in the lower position. (Shown by full lines, Fig. 4.)

25 designates the mail-box forming a receptacle for letters, newspapers, and other mail-matter, which is placed therein or removed therefrom by elevating lid 26, secured to the top of the mail-box by hinges 27. Said lid and top are inclined in opposite directions, as shown in Fig. 3, in order to shed rain, and thus protect the contents of the box. The mail-box is suspended from a two-wheeled truck comprising a pair of vertical hangers 28, secured at their lower ends to the top of the box and formed into yokes 29 at their upper portions for the reception of sheave-wheels 30, mounted on transverse shafts 31, secured in the opposite sides of the yokes, a pair of longitudinal side bars 32, connecting the yokes, and a longitudinal bar 33, secured near its opposite ends to the lower bent portions 34 of the hangers.

35 designates a curved retaining-spring bearing at its lower portion against bar 33 and secured at its opposite ends to the side bar 32, connecting the ends of the yokes on the side opposite from hangers 28, so that in case sheave-wheels 30 jump the track bar 34, retaining-spring 35, and hangers 28 will prevent the mail-box from turning over or contacting with the supporting-posts 1 and bows 2.

The mail-box is attached to the propelling-cable by a ring 36 and a short depending bar 37, which latter is secured to the end of the box farthest from sheave-wheel 10 in order that the opposite end of the box will overlap said sheave-wheel and contact with a buffer 38, secured to support 7, to stop the mail-box with the least possible shock when it arrives at the road end of the track.

In order to relieve the operating-cable of undue friction at the points where it descends and ascends an inclination, we provide sheave-wheels 39, mounted upon transverse shafts 40, secured at their opposite ends in depending yokes 41, the upper ends of which latter are bent in opposite directions in the form of segments 42 43, the latter of which are secured to the supporting-posts, as shown in Fig. 7.

In practice the mail-box is normally left at the road end of the track within easy reach of the person collecting and delivering the mail. After said person deposits the mail in box 25 the latter is pushed along the track a sufficient distance to cause one of cranks 18 to strike bell 20, so the shock produced thereby will vibrate wire 21, which in turn rings the bell and notifies an operator in the house, who grasps handles 19 and operates the motor until the mail-box is brought into contact with the latter. Bell 20 is supported above the path of its contacting crank by engaging wire 21 with a hook 44, projecting from the casing, preparatory to turning the cranks.

As the mail-box will at times be swayed more or less by the wind during its travel from one end of the track to the other, the ends 32ª of side bars 32 are turned outwardly to prevent their contacting with eyelets 3 and are curved to prevent their contacting with arms 4. If desired, the ends of the mail-box may be pointed to prevent their contacting with arms 4 or bows 2.

The ends 33ª of bar 33 are beveled upwardly to insure their passing beneath arms 4 of eyelets 3 in case they should contact with said arms.

Retaining-spring 35 is pressed upwardly on contacting with any one of arms 4, but after passing over the latter immediately springs down into contact with bar 33, and thus prevents any possibility of the mail-box leaving the track.

Having thus described our invention, what we claim, and desire to secure by Letters Patent, is—

1. In an apparatus of the character described, an elevated rail, a mail-box mounted thereon, a cable attached to the box and operatively mounted on sheave-wheels at each end of the track, a motor located at one end of the track for propelling the cable, oppositely-disposed cranks for operating the motor, and a bell depending in the path of one of said cranks.

2. In an apparatus of the character described, suitable supports, upper and lower eyelets projecting from one side thereof, a rail carried by the upper eyelets, a mail-box suspended from the rail, an endless cable attached to the box and having one strand extending through the lower eyelets, sheave-wheels at opposite ends of the rail around which the cable operates, a motor for propelling the cable, and bows secured to the supports loosely embracing the upper eyelets and the upper strand of the cable.

3. In an apparatus of the character described, suitable supports, a track carried thereby, a mail-box mounted on the track, a cable attached to the box and operatively mounted on sheave-wheels at each end of the track, a motor for propelling the cable, depending yokes secured to the supports having segmental upper ends, and sheave-wheels mounted in said yokes.

4. In an apparatus of the character described, a suitable mail-box, hangers secured to said box, yokes formed integral with the upper portions of the hangers, parallel side bars connecting the yokes, a longitudinal bar connecting the lower portions of the hangers, and a retaining-spring secured to one of the parallel bars on the opposite side from the hangers and bearing at its lower portion against the lower longitudinal bar.

In testimony whereof we affix our signatures in the presence of two witnesses.

CHARLES C. FARMER.
JOHN J. STUCKEY.

Witnesses:
IRVIE KAY,
ARTHUR M. JACKSON.